(12) United States Patent
Bissontz

(10) Patent No.: US 7,281,595 B2
(45) Date of Patent: Oct. 16, 2007

(54) SYSTEM FOR INTEGRATING BODY EQUIPMENT WITH A VEHICLE HYBRID POWERTRAIN

(75) Inventor: Jay E. Bissontz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 199 days.

(21) Appl. No.: 11/301,497

(22) Filed: Dec. 13, 2005

(65) Prior Publication Data

US 2007/0135257 A1    Jun. 14, 2007

(51) Int. Cl.
*B60K 1/00* (2006.01)
*B60K 16/00* (2006.01)

(52) U.S. Cl. .................................. 180/65.4; 180/65.8
(58) Field of Classification Search ............... 180/65.8, 180/65.7, 65.4; 477/5, 3
See application file for complete search history.

(56) References Cited

U.S. PATENT DOCUMENTS

| | | | |
|---|---|---|---|
| 6,038,500 A * | 3/2000 | Weiss | 701/22 |
| 6,272,402 B1 | 8/2001 | Kelwaski | |
| 6,364,042 B1 * | 4/2002 | Joachim | 180/65.2 |
| 6,442,455 B1 * | 8/2002 | Kotre et al. | 701/22 |
| 6,484,830 B1 * | 11/2002 | Gruenwald et al. | 180/65.2 |
| 6,789,519 B1 | 9/2004 | Bell | |

* cited by examiner

*Primary Examiner*—Dirk Wright
(74) *Attorney, Agent, or Firm*—Jeffrey P. Calfa; Gerald W. Askew

(57) ABSTRACT

A control system for a hybrid vehicle equipped with power takeoff equipment provides a multi-bus, network environment, integrating operation of a vehicle electric traction motor, power takeoff equipment including prospectively hydraulic motion control equipment and a vehicle thermal engine. The control system is readily programmable to allow reconfiguration depending upon the character of the equipment installed. Efficient utilization of the vehicle's thermal engine and enhanced system robustness is obtained.

14 Claims, 9 Drawing Sheets

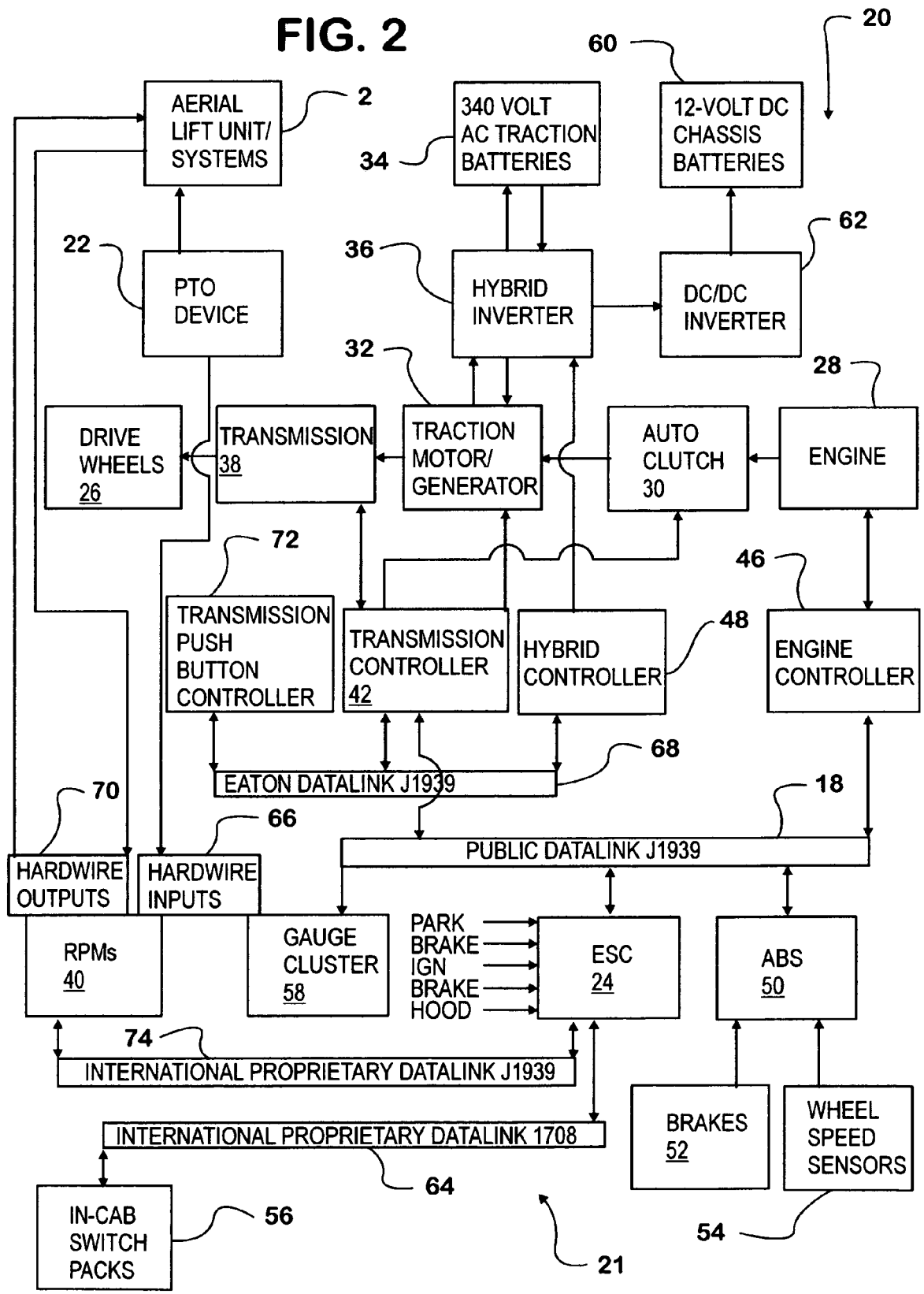

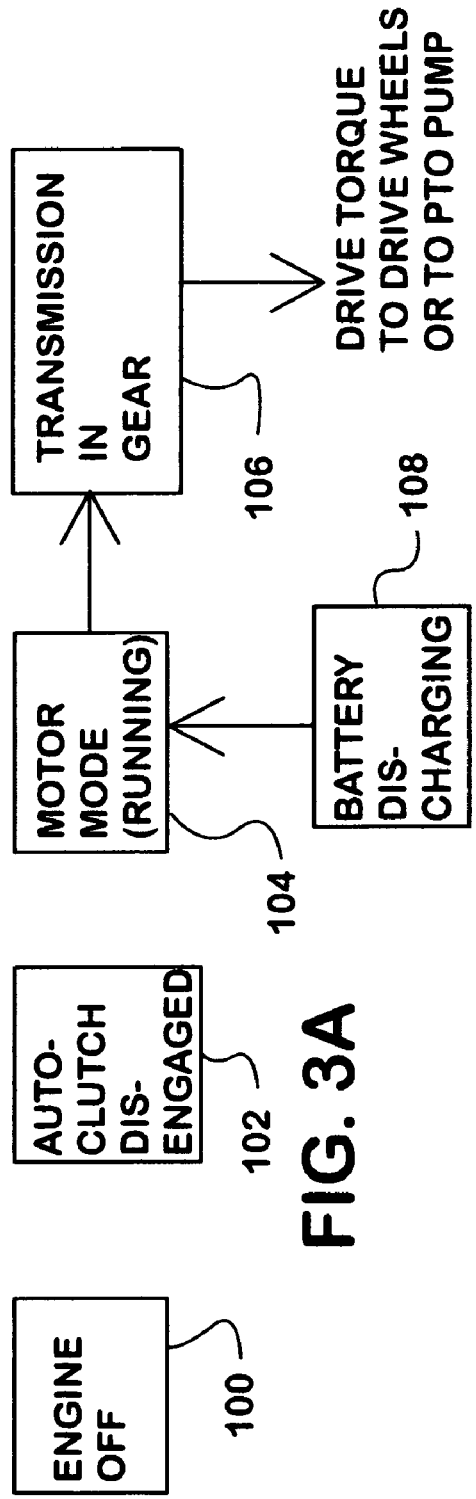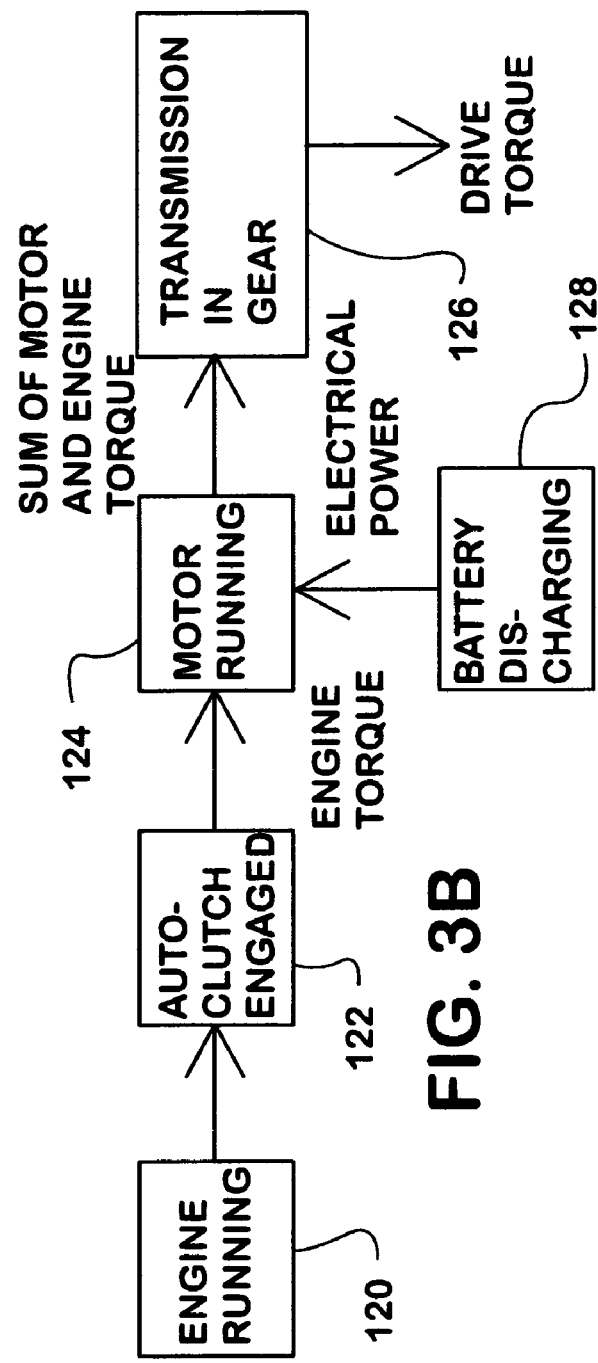
FIG. 3A
FIG. 3B

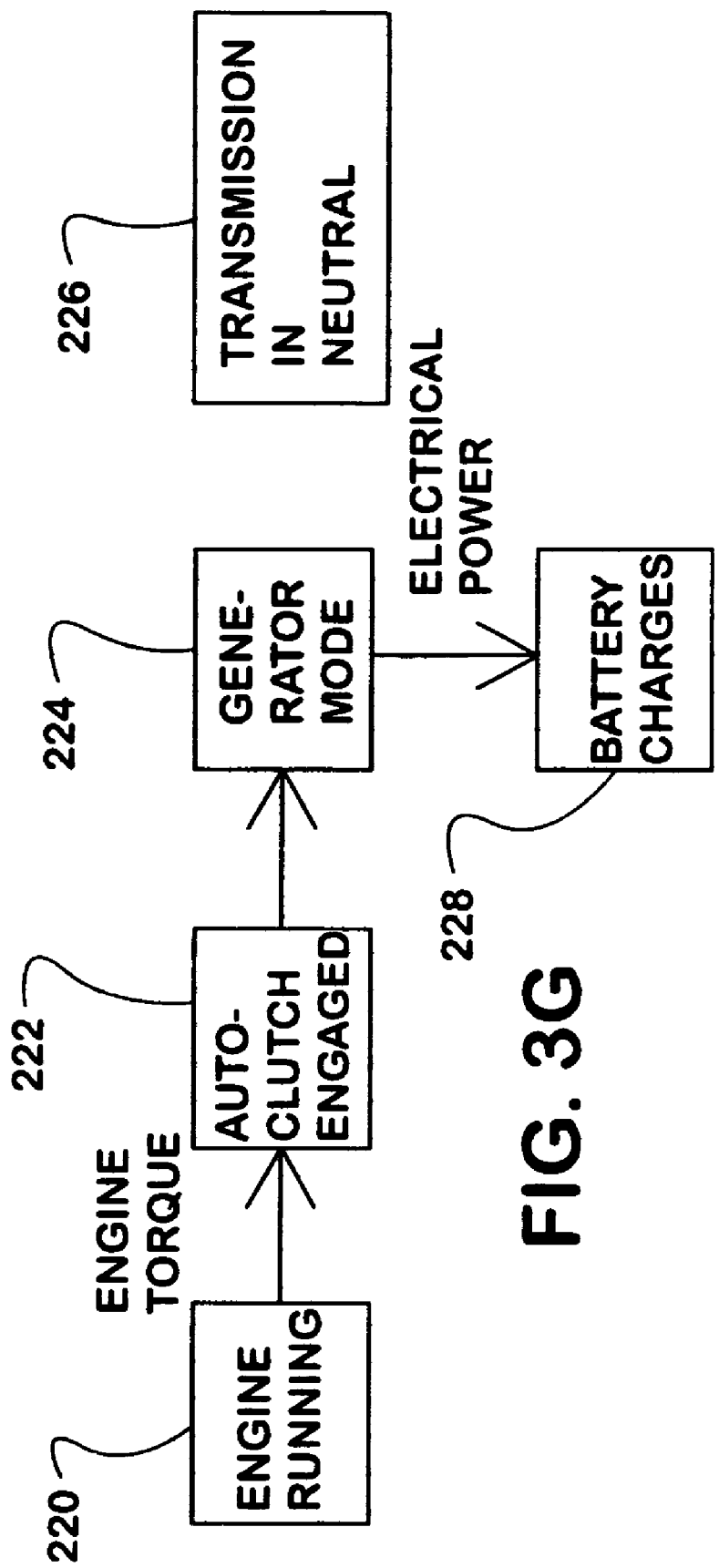

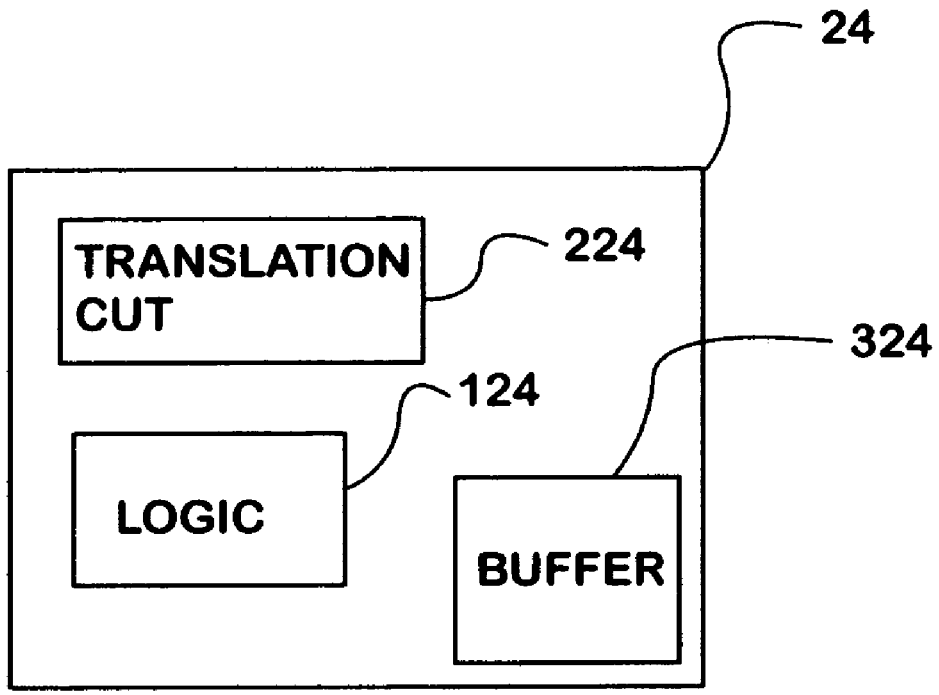
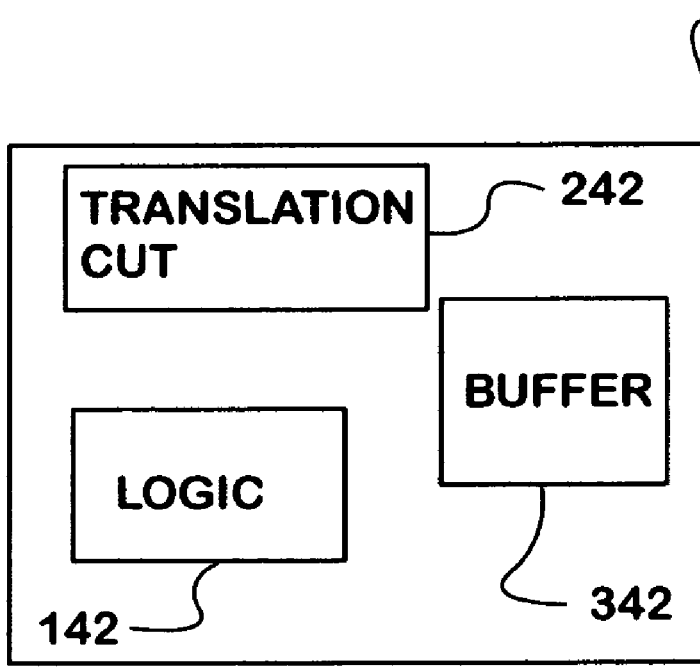
FIG. 4

SYSTEM FOR INTEGRATING BODY EQUIPMENT WITH A VEHICLE HYBRID POWERTRAIN

BACKGROUND OF THE INVENTION

1. Technical Field

The invention relates to integrating power takeoff equipment with a motor vehicle control system, and more particularly to extend functionality, simplify system modification, improve robustness and optimize fuel usage in a hybrid diesel/electric vehicle platform.

2. Description of the Problem

The use of a hybrid vehicle chassis to support power takeoff (PTO) equipment, such as aerial towers (colloquially called "cherry pickers"), garbage trucks, liquid fuel delivery trucks and the like, is relatively new. Integration of the control of PTO equipment, particularly in a way which best utilizes the fuel reserve of the vehicle, has been given little attention. Were control of the PTO equipment simply carried over from conventional vehicles there would be no operational optimization of the system and the systems would remain highly inflexible.

Many contemporary vehicles are now equipped with body computers, local controllers and controller area networks to implement most aspects of vehicle control. In vehicles designed, built and sold by International Truck and Engine Corporation, an Electrical System Controller ("ESC") carries out the functions of the body computer. Local controllers which communicate with each other and with the ESC to distribute data and requests essential for operation of local programming by which control is implemented.

In a conventional vehicle only the vehicle's engine is usually capable of meeting the power demands required by PTO equipment. This engine, typically a diesel capable of moving a truck at highway speeds, is designed to provide far more power than is required by the PTO equipment and accordingly is not operated in an optimal manner when the vehicle is supporting PTO operation. The problem is magnified in the environment of an aerial tower vehicle where the vehicle is not moving during PTO operation and PTO operation itself may only be occasional as demanded by an operator. If the engine is kept running much fuel is wasted with the engine idling while waiting for operator inputs and in parasitic losses. In certain types of hybrid configurations the traction motor used for starting the vehicle from a standing start may be available for supporting PTO. Electrical motors suffer far less from parasitic losses than do thermal engines and demand relatively little power input in excess of their output. However, it is not a simple matter of just applying the traction motor to supporting PTO operation. Any operational scheme must take into battery charge status and be able to sustain PTO operation from the thermal engine if required.

Prior art vehicles equipped for PTO operations have typically included an array of relays and extensive hardwiring to support the equipment. This has made the vehicles difficult to modify and subject to hardware failure. Further complicating merged control of the systems is that major subsystems of such a vehicle, particularly a hybrid vehicle come from different manufacturers. For example, in the aerial tower, hybrid vehicle considered in the present application Eaton Corp. supplies the traction motor, transmission, transmission controller, hybrid controller, lithium-ion battery, gear selection controller and inverter; International Truck and Engine supplies the body computer, engine and integrates the components into a vehicle, the chassis mounted PTO equipment may come from a number of sources although the preferred source for an aerial tower is Altec Industries which supplies electromagnetic controlled hydraulic valves, proximity switches, toggle switches, electric motors, relays, solenoids and lights.

The Eaton sub-system consists of modular sub-components installed on the International chassis. Unless coupled, these the subcomponents along with much of the International chassis' system have no clue as to what is going on with the chassis mounted PTO equipment. It is however, absolutely imperative that these systems do know, because it is their job to provide hydraulic and electrical potential to the chassis mounted PTO equipment via the transmission mounted PTO and supporting chassis electrical architecture at the appropriate times and for the appropriate intervals to support precise equipment functionality. Conversely, these systems need to communicate with the chassis mounted PTO equipment for the same reasons previously assigned. The problem created by this communication gap is two fold. The first problem is that the chassis mounted PTO equipment has no way to communicate with the rest of the controllers on the datalink architecture. The second problem is that were the chassis mounted PTO equipment to have a means of communication, what messages would be passed and how would they be formatted? In addition, what systems on the vehicle data bus would listen to on the datalink as it relates to the other control modules and their associated components?

SUMMARY OF THE INVENTION

According to the invention there is provided a hybrid diesel-electric vehicle equipped with power takeoff operation accessories. The hybrid diesel-electric vehicle includes a conventional public data bus with its body computer, and at least two, but preferably at least three secondary data buses. One secondary data bus interlinks a transmission controller with a hybrid system controller and transmission gear selection controller and provides a gateway to the public data bus. Another secondary controller links a generic programmable module used for PTO accessory control with the body computer, which in turn provides a gateway to the public data bus. Still another secondary data bus is connected between a switch pack and the body computer, which again provides a gateway to the public data bus.

Control of the power takeoff operation accessories are integrated into one or more remote power modules (RPMs). The RPMs are extensions of a body computer/electrical system controller (ESC) through a controller area network (here a proprietary J1939 datalink interface). The ESC then carries out control of and communication for power takeoff operation accessories. In this way integration with the rest of the controllers over a public portion of the datalink architecture is effected.

The integration of these varied components over a datalink architecture including their precision functionality is achieved through software preferably implemented using International Truck and Engine's Diamond Logic™ Builder (DLB) software configuration tool. The integration and control strategy takes into account the base hybrid system, transmission, auto clutch, engine, anti-block braking system (ABS) and PTO accessory functionality allowing them to work in a symbiotic relationship in according to a particular set of flexible and ever changing requirements. The claim in its broadest sense has to do with an approach/strategy of integrating a hybrid drive system to TEM chassis mounted equipment through a datalink system resident on a commercial or other wise custom truck chassis through flexible software rather than a specific set of functional requirements.

Control arrangements are finalized by programming, which may be specific to a particular vehicle and alterable with time, the vehicle gains flexibility and system robustness is enhanced. In addition, energization of the PTO accessory may be effected in a way which minimizes fuel usage. The hybrid vehicle traction motor is employed, under normal circumstances, to supply power for PTO operation. Typically stored electrical power is used. This electrical power typically represents power stored from regenerative braking. However, it may also represent power stored at any time when the diesel is operated at levels where its power output exceeds immediate demands for power from the engine. In response to indication of a low state of charge of the battery, the engine may be operated to support PTO operation, but when doing so it is operated at its optimal output with the excess power produced being diverted to generate electricity for storage. Thus the engine is operated only briefly and at its optimal power level, minimizing the effect of parasitic losses.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a high level schematic of a vehicle control system for a hybrid vehicle equipped with a PTO application.

FIGS. 3A-3G are state diagrams of the vehicle drive train.

FIG. 4 illustrates the location and character of translation routines used by controllers for inter bus/data link communication.

DETAILED DESCRIPTION OF THE INVENTION

Figure 1:
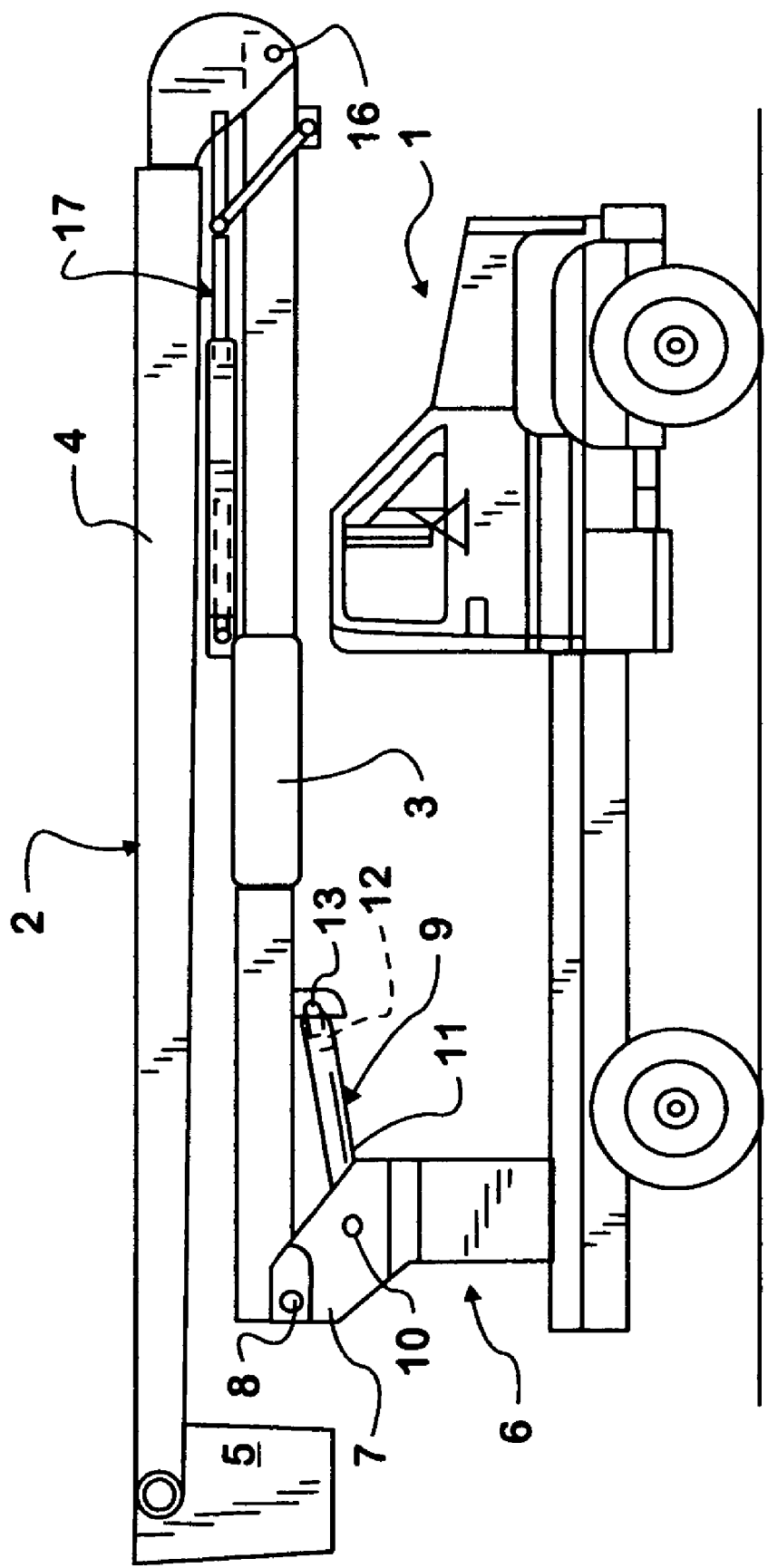
FIG. 1 is a simplified illustration of a truck mounted aerial lift assembly for locating an operator in various raised positions.

Referring now to the figures and in particular to FIG. 1, an example of a mobile aerial lift truck 1 is illustrated. The mobile aerial lift truck 1 includes an aerial lift unit 2 mounted to a bed on the back portion of the truck. The aerial lift unit 2 includes a lower boom 3 and an upper boom 4 pivotally interconnected to each other. The lower boom 3 is in turn mounted to rotate on the truck bed on a support 6 and rotatable support bracket 7. The rotatable support bracket 7 includes a pivoting mount 8 for one end of lower boom 3. A bucket 5 is secured to the free end of upper boom 4 and supports personnel during lifting of the bucket to and support of the bucket within a work area. Bucket 5 is pivotally attached to the free end of boom 4 to maintain a horizontal orientation at all times. A lifting unit 9 is interconnected between bracket 7 and the lower boom 3. A pivot connection 10 connects the lower boom cylinder 11 of unit 9 to the bracket 7. A cylinder rod 12 extends from the cylinder 11 and is pivotally connected to the boom 3 through a pivot 13. Lower boom cylinder unit 9 is connected to a pressurized supply of a suitable hydraulic fluid, which allows the assembly to be lifted and lowered. As discussed below, the primary source of pressurized hydraulic fluid is preferably an automatic transmission.

The outer end of the lower boom 3 is interconnected to the lower and pivot end of the upper boom 4. A pivot 16 interconnects the outer end of the lower boom 3 to the pivot end of the upper boom 4. An upper boom compensating cylinder unit or assembly 17 is connected between the lower boom 3 and the upper boom 4 for moving the upper boom about pivot 16 to position the upper boom relative to the lower boom 3. The upper boom compensating cylinder unit 17 is constructed to permit independent movement of the upper boom 4 relative to lower boom 3 and to provide compensating motion between the booms to raise the upper boom with the lower boom. Unit 17 is supplied with pressurized hydraulic fluid from the same sources as unit 9.

Referring to FIG. 2, a high level schematic of a control system 21 which provides vehicle 1 control and fuel usage management is illustrated. An electrical system controller 24, a type of a body computer, is linked by a public datalink 18 to a variety of local controllers which in turn implement direct control over most vehicle 1 functions. Electrical system controller (ESC) 24 may also be directly connected to selected inputs and outputs. As illustrated, an ignition switch input, a brake pedal position input and a park brake position sensor are connected to supply signals to the ESC 24. In some embodiments, a fuel level sensor input and a throttle position input may also supply signals to the ESC 24. Signals for PTO operational control from within a cab may be implemented using an In-cab switch pack(s) 56. In-cab switch pack 56 is connected to ESC 24 over a proprietary data link 64 conforming to the SAE J1708 standard. Data link 64 is a low baud rate data connection, typically on the order of 9.7 Kbaud. Four major local controllers in addition to the ESC 24 are illustrated connected to the public datalink 18. These controllers are the engine controller 46, the transmission controller 42, a gauge controller 58 and an antiblock brake system controller (ABS) 50. Datalink 18 is preferably the bus for a public controller area network (CAN) conforming to the SAE J1939 standard and under current practice supports data transmission at up to 250 Kbaud. It will be understood that other controllers may be installed on the vehicle 1 in communication with datalink 18. ABS controller 50, as is conventional, controls application of brakes 52 and receives wheel speed sensor signals from sensors 54. Wheel speed is reported over datalink 18 and is monitored by transmission controller 42.

Vehicle 1 is preferably a hybrid diesel electric vehicle which utilizes a drive train 20 in which the traction motor/generator 32 is connected in line with an engine 28. As with other hybrid designs, the system is intended to recapture the vehicle's inertial momentum to supplement engine output. Drive train 20 is a particular variation of hybrid design which affords advantages in a utility application. It is further intended for operation of the engine 28 to support PTO operation both directly, and by use to generate electrical power for storage. In this way the engine 28 is run at its optimal power output level when used in direct support of PTO operation (and possibly any other time when the engine might otherwise be called on to run). A traction motor/generator 32 is used to recapture vehicle kinetic energy during deceleration by using the drive wheels 26 to drive the traction motor/generator 32. Engine 28 may be utilized to supply power to generate electricity, to both generate electricity and operate PTO system 22, to provide motive power to drive wheels 26, or to provide motive power and to run a generator to generate electricity. Where the PTO system 22 is an aerial lift unit 2 it is unlikely that it would be operated when the vehicle was in motion, and the description here assumes that in fact that the vehicle will be required to be stopped, but other PTO applications may exist where such would occur. Under such circumstances, with sufficient engine capacity, it is conceivable that electrical power generation, motive power generation and PTO operation could be concurrent.

Drive train 20 provides for the recapture of kinetic energy in response to the traction motor/generator 32 being back driven by the vehicle's kinetic force. These transitions between positive and negative traction motor contribution are detected and managed by a hybrid controller 48. Traction motor/generator 32, during braking, generates electricity which is applied to a storage battery 34 through inverter 36. Hybrid controller 48 looks at the ABS controller 50 datalink traffic to determine if regenerative kinetic braking would increase or enhance a wheel slippage condition if regenerative braking were initiated. Transmission controller 42 detects such traffic on datalink 18 and translates this as control signals for application to hybrid controller 48 over datalink 68. Traction motor/generator 32, during braking, generates electricity which is applied to a Lithium-ion storage battery 34 through hybrid inverter 36. Some electrical power may be diverted from hybrid inverter to maintain the charge of a conventional 12-volt DC Chassis battery 60 through a DC/DC inverter 62.

Battery 34 is a lithium-ion battery and is preferably the only electrical power storage system for vehicle 1. Lithium ion batteries are used in 42 volt DC power systems. In vehicles contemporary to the writing of this application numerous 12 volt applications remain in common use and vehicle 1 may be equipped with a parallel 12 volt system to support these systems. This possible parallel system is not shown for the sake of simplicity of illustration 12 volt DC motor vehicle power systems based on an engine driven alternator and 12 volt, 6 cell lead acid batteries have been in use for decades and are well known to those skilled in the art. Inclusion of such a parallel system would allow the use of readily available and inexpensive components designed for motor vehicle use, such as incandescent bulbs for illumination. Otherwise the weight penalty and extra complexity introduced by 12 volt components is considered undesirable.

Traction motor/generator 32 may be used to propel vehicle 1 by drawing power from battery 34 through inverter 36, which supplies 3 phase 340 volt rms power. Battery 34 is sometimes referred to as the traction battery to distinguish it from a secondary 12 volt lead acid battery 60 used to supply power to various vehicle systems. High mass vehicles tend to exhibit far poorer gains from hybrid locomotion than do conventional vehicles. The preferred use of stored electrical power is thus is power PTO system 22. In addition, traction motor/generator 32 is used for starting engine 28 when the ignition is in the start position. Under some circumstances engine 28 is used to drive the traction motor/generator 32 with the transmission 38 in a neutral state to generate electricity for recharging battery 34 and/or engaged to the PTO system 22 to generate electricity for recharging the battery 34 and operate the PTO system 22. This would occur in response to heavy PTO system 22 use which draws down the charge on battery 34. Typically engine 28 has a far greater output capacity than is required for operating PTO system 22. As a result using it to directly run PTO system 22 full time would be highly inefficient due to parasitic losses incurred in the engine. Greater efficiency is obtained by running engine 22 at close to its rated output to recharge battery 34 and then shutting down the engine and using battery 34 to supply electricity to traction motor/generator 32 to operate PTO system 22. An aerial lift unit 2 is often used only sporadically by a worker for reposition of basket 5 and wasteful idling of engine 22 is thus avoided. Engine 22 runs periodically at an efficient speed to recharge the battery only if required by the battery 34 state of charge. Battery 34 state of charge is determined by the hybrid controller 48, which passes this information to transmission controller 42 over datalink 68. Transmission controller 42 can in turn can request ESC 24 to engage engine 28 by a message to the ESC 24, which in turn sends power request signals, (and start and stop signals) to engine controller 46. The availability of engine 28 may depend on certain programmed (or hardwired) interlocks, such as hood position.

Drive train 20 comprises an engine 28 connected in line with an auto clutch 30 which allows disconnection of the engine 28 from the rest of the drive train when the engine is not required for motive power or for recharging battery 34. Auto clutch is directly coupled to the traction motor/generator 32 which is in turn connected to a transmission 38. Transmission 38 is in turn used to apply power from the traction motor/generator 32 to either the PTO system 22 or to drive wheels 26. Transmission 38 is bi-directional and can be used to transmit energy from the drive wheels 26 back to the traction motor/generator 32. Traction motor/generator 32 may be used to provide motive energy (either alone or in cooperation with the engine 28) to transmission 38. When used as a generator the traction motor/generator supplies electricity to inverter 36 which supplies direct current for recharging battery 34.

A control system 21 implements cooperation of the control elements to effect the operations just described. ESC 24 receives inputs relating to throttle position, brake pedal position, ignition state and PTO inputs from a user and passes these to the transmission controller 42 which in turn passes them to the hybrid controller 48. Hybrid controller 48 determines, based on available battery charge state, requests for power. Hybrid controller 48 with ESC 24 generates the appropriate signals for application to datalink 18 for instructing the engine controller 46 to turn engine 28 on and off and, if on, at what power output to operate the engine. Transmission controller 42 controls engagement of auto clutch 30. Transmission controller 42 further controls the state of transmission 38 in response to transmission push button controller 72, determining the gear the transmission is in or if the transmission is to deliver drive torque to the drive wheels 26 or to a hydraulic pump which is part of PTO system 22 (or simply pressurized hydraulic fluid to PTO system 22 where transmission 38 serves as the hydraulic pump) or if the transmission is to be in neutral.

PTO control is implemented through one or more remote power modules (RPMs). Remote power modules are datalinked expansion input/output modules dedicated to the ESC, which is programmed to utilize them. RPMs 40 function as the PTO controller, and provide hardwire outputs 70 and hardwire inputs 66 required by the PTO device 22 and to and from the aerial lift unit 2. Requests for movement from the aerial lift unit 2 and position reports are applied to the proprietary datalink 74 for transmission to the ESC 24, which translates them into specific requests for the other controllers, e.g. a request for PTO power. ESC 24 is also programmed to control valve states through RPMs 40 in PTO device 22. Remote power modules are more fully described in U.S. Pat. No. 6,272,402 which is assigned to the assignee of the present invention and is fully incorporated herein by reference. At the time the '402 patent was written what are now termed "Remote Power Modules" were called "Remote Interface Modules".

Transmission controller and ESC 24 both operate as portals and/or translation devices between the various datalinks. Proprietary datalinks 68 and 74 operate at substantially higher baud rates than does the public datalink 18, and accordingly, buffering is provided for a message passed from one link to another. Additionally, a message may have to be reformatted, or a message on one link may require another type of message on the second link, e.g. a movement request over datalink 74 may translate to a request for transmission engagement from ESC 24 to transmission controller 42. Datalinks 18, 68 and 74 are all controller area networks and conform to the SAE J1939 protocol. Datalink 64 conforms to the SAE J1708 protocol.

FIG. 4 illustrates that both ESC 24 and transmission controller 42 provide massage translation tables 224, 242, interpretive logic 124, 142 and message buffering 324, 342 for communication occurring on one datalink requiring a response by a controller coupled only to another datalink. The transmission controller 42 and ESC 24 thus provide inter-operation between four data buses. Datalink 68 is part of a hybrid transmission controller system produced by Eaton Corporation and does not form part of the invention. In effect, ESC 24 and transmission controller 42 can act as gateways, passing messages from one channel to another or, depending upon the message, may carry out operations based on the message and issue responsive messages to any or all of the datalinks to which the particular controller is connected.

FIGS. 3A-G are a series of state diagrams illustrating the combinational modes of engine, clutch, motor/generator, battery and transmission, to effect implementation of the invention. As noted above, high mass motor vehicles benefit less from use of storage of regenerative power from braking than do low mass passenger cars. However, where such vehicles are used as mobile platforms to deliver, and power, equipment used at work sites, regenerative power is advantageously applied to powering PTO equipment due to the mismatch of the vehicle's engine to the application. The particular programming on any given vehicle may be unique to that vehicle.

FIG. 3A illustrates direct hybrid electric mode of vehicle 1 where battery 34 is the sole source of power to PTO system 22. Engine 28 is in an off mode 100. Autoclutch 30 is disengaged 102 so no torque is transmitted between traction motor/generator 32 and engine 28. Instead traction motor/generator 32 draws power from battery 34 (discharge mode 108) and operates as a motor 104 supplying motor torque as demanded to the transmission 38. Transmission 38 is in gear 106 to supply drive torque to either the drive wheels 26 or to a PTO system 22.

FIG. 3B illustrates an engine/battery operational mode of vehicle 1 where both the battery 34 and the engine 28 supply power to generate drive torque for use by PTO system 22, more likely, or to propel vehicle 1. Engine 28 is running 120, supplying engine torque to autoclutch 30 which in turn is engaged 122. Autoclutch 30 supplies torque to traction motor/generator 32 which is operating as a motor 124, drawing power from battery 34 and supplementing the torque generated by the engine. The combined torque of the motor 124 and running engine 120 is applied to an in gear transmission 126 which in turn supplies drive torque to the drive wheels 26. This operational mode would be expected under circumstances of hard acceleration or other circumstances where vehicle 1 was being used under conditions demanding high torque for operation. The total power output would typically greatly exceed any possible demand from PTO system 22.

Figure 3C:
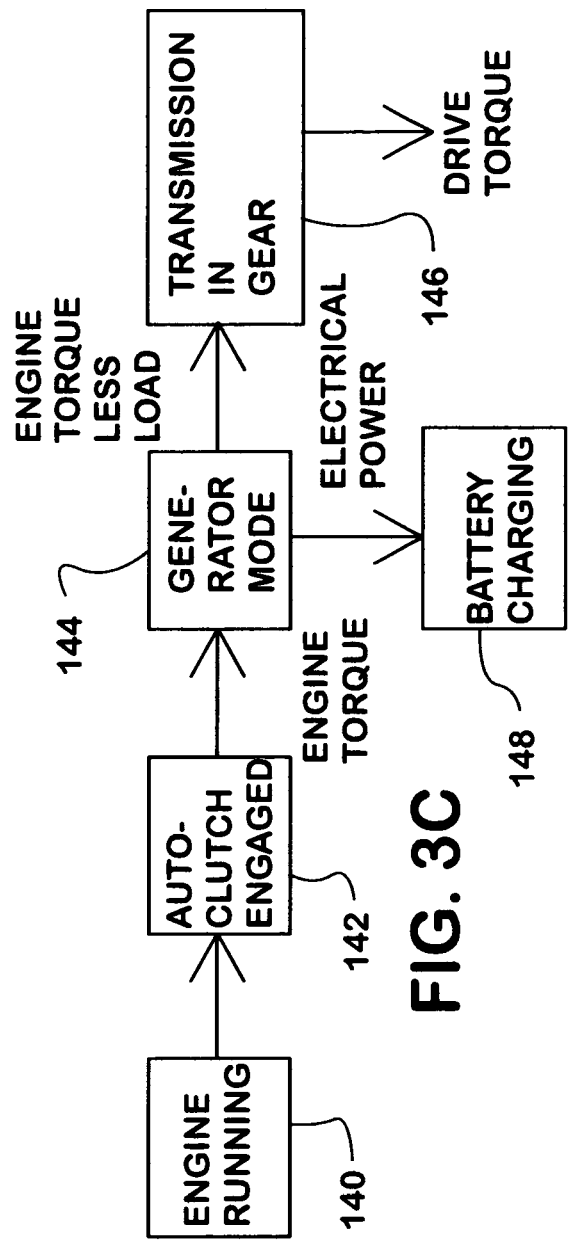

FIG. 3C illustrates an engine/battery operational mode of vehicle 1 where the engine 28 supplies power both to generate drive torque for use by PTO system 22, or to propel the vehicle, and to generate electrical power to recharge 148 the battery 34. Engine 28 is running 140, supplying engine torque to autoclutch 30 which in turn is engaged 142. Autoclutch 30 supplies torque to traction motor/generator 32 which is operates as a generator 144 to supply recharging current to battery 34 (battery recharge mode 148). The combined torque of the running engine 140 less the load imposed by generator 144 is applied to an in gear transmission 146 which in turn supplies drive torque to the drive wheels 26 or to PTO system 22. This operational mode would be expected when a low state of charge of battery 34 has been indicated and vehicle fuel reserves are sufficient to allow continued PTO operation. Fuel reserves could be low enough to trigger discontinuing recharging and inhibit PTO operation, other than stowing the PTO system.

Figure 3D:
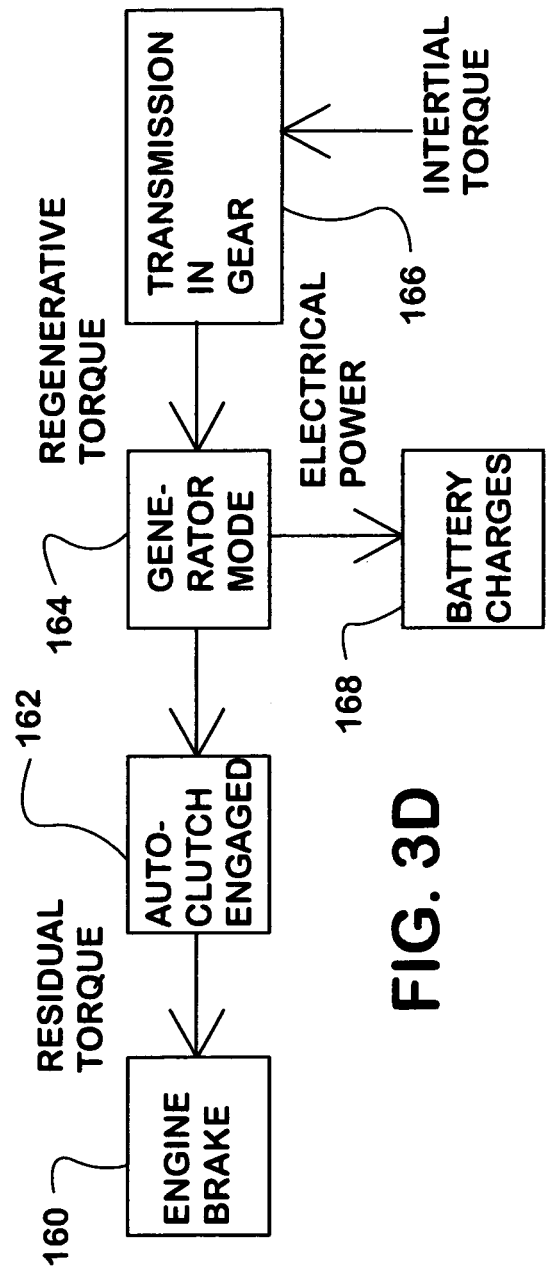

FIG. 3D illustrates an engine/battery operational mode of vehicle 1 where the engine 28 is operating as an engine brake 160 and the vehicle's inertia supplies drive torque used to regenerate electrical power for storage in battery 34. Engine braking 160 may be used in response to an indication that battery 34 is close to a full charge, or because the braking demand indicated by the brake position sensed by the ESC 24 indicates that braking demand exceeds the capacity of the battery 34 to accept power. Inertial torque is applied to an in gear transmission 166 which applies regenerative torque to traction motor/generator 32 operating in generator mode 164. Electrical power is returned to battery 34 in recharge mode 168. Residual torque is passed by engaged clutch 162 to engine 28 operating as an engine brake 160.

Figure 3E:
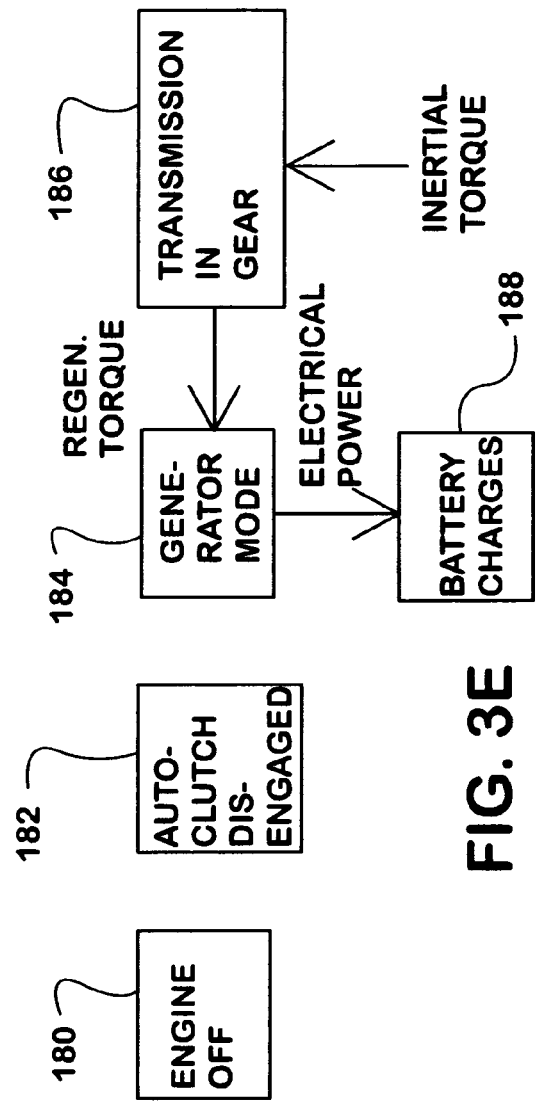

FIG. 3E illustrates a pure regenerative braking mode of vehicle 1 where the vehicle's inertia supplies drive torque used to regenerate electrical power for storage in battery 34. Engine 28 is off 180 and autoclutch 30 is disengaged 182. Responsive to detection of depression of a brake pedal or to indication from a speed control system of excessive speed, inertial torque is applied to an in gear transmission 186 which applies regenerative torque to traction motor/generator 32 operating in generator mode 184. Electrical power is returned to battery 34 in recharge mode 188. It would be theoretically possible to recover energy from PTO system 22, such as in the circumstance of recovering energy from an elevated aerial lift unit 2. However, the amount of energy available for recovery is regarded as too slight in an aerial lift unit 2 to justify the complication in control that this would involve. Control would have to accommodate both the recovery of the potential energy represented by the elevated lift unit and the diversion of energy that would required to control the aerial lift unit 2 for stowage or repositioning.

Figure 3F:
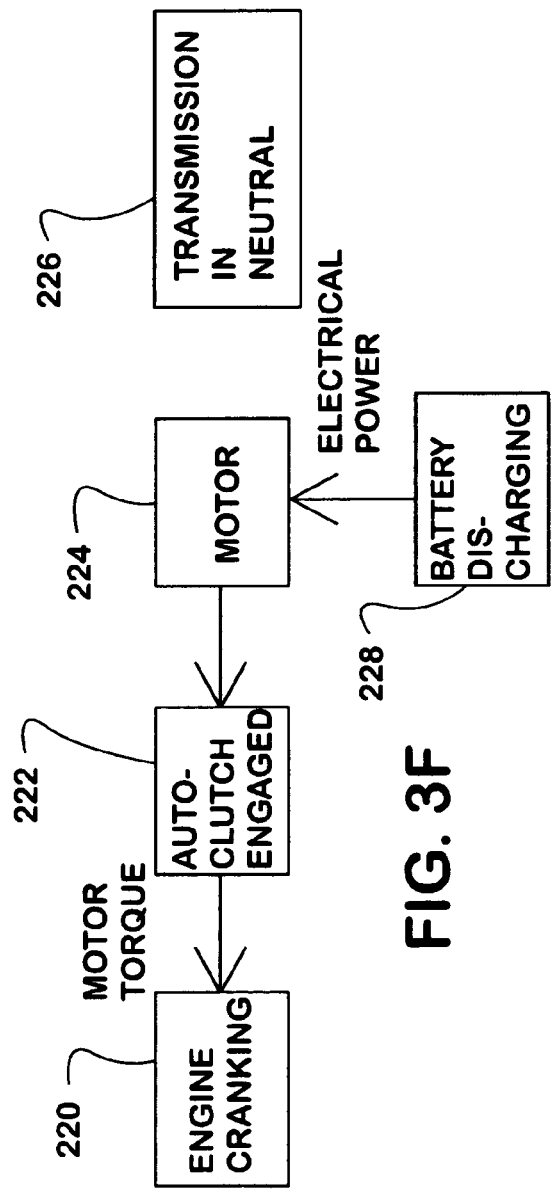

FIG. 3F illustrates an engine starting mode. This could occur on start up of vehicle 1, or in response to indication of a low state of battery charge during PTO operation. Engine 28 is cranking 200 with autoclutch 30 disengaged 202 to deliver cranking torque to the engine from motor 204. The transmission 38 is moved to neutral 206, temporarily interrupting delivery of power to PTO system 22 if the PTO system is engaged. Where PTO system 22 is engaged, appropriate delays, or safety steps, may be programmed in to prevent inconvenient interruption of PTO system 22 operation before the engine cranks 200. Warning is typically provided the operator and, if necessary, interlocks may be engaged to prevent undesired movement of an aerial tower, or unexpected interruption of PTO operation. The particular conditions involved depend upon the specific application, but generally would be the same as the interlocks used in present applications.

FIG. 3G illustrates battery recharging 228, typically as would occur during an interruption of PTO operation and following engine cranking. This operational state is an alternative to the mode described in connection to that describe with FIG. 3C and maintains interruption of PTO operation while the battery is recharged, preferably while with the engine running 220 at its most efficient loading. Torque is applied from a running engine 220 to an engaged auto clutch 222 and through the clutch to the traction motor/generator 32 operating as a generator 224. Electrical power is used for battery recharging 228. No drive torque is produced by a transmission which is in neutral 226.

Figure 5:
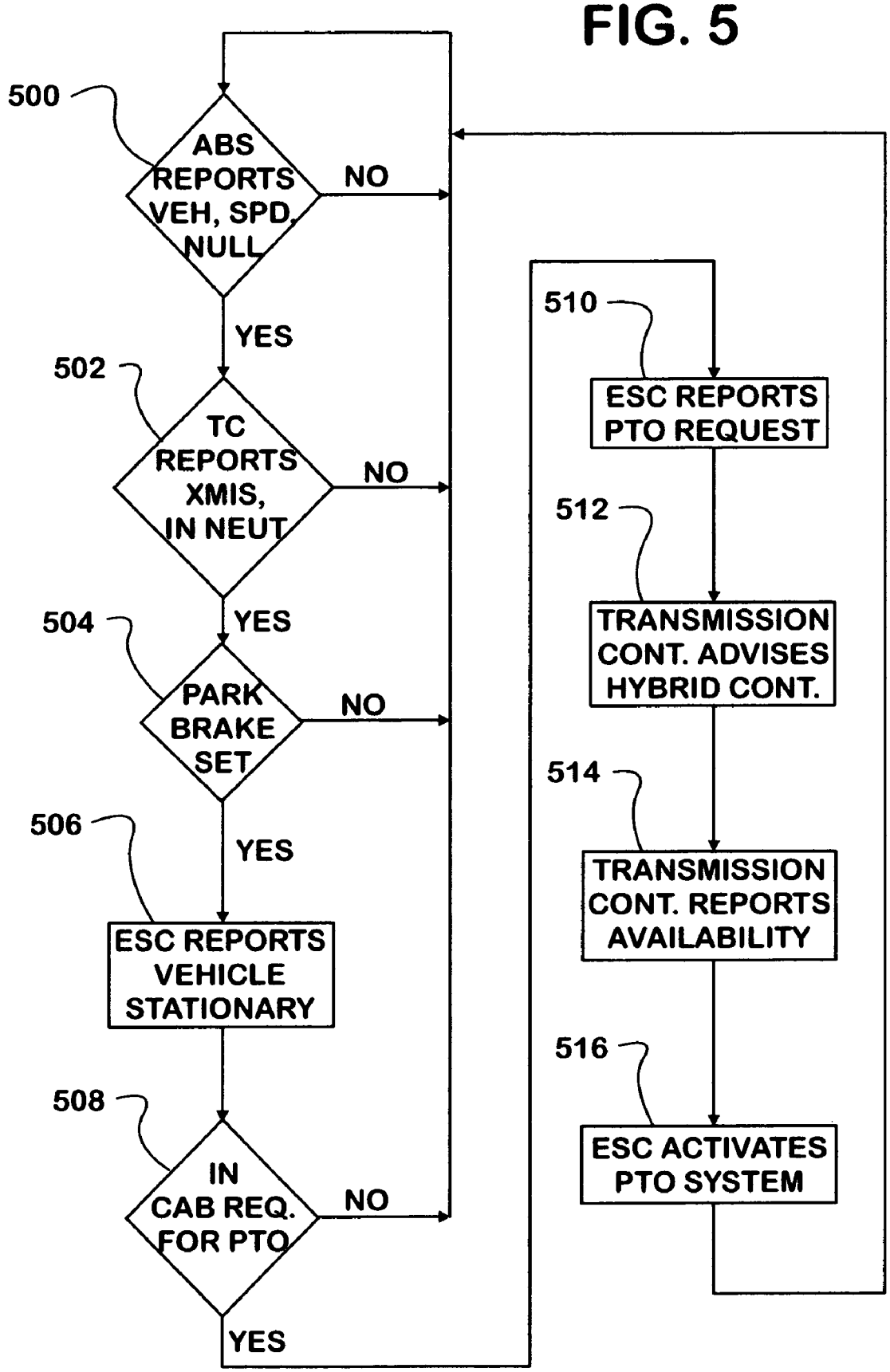
FIG. 5 is a high level flow chart illustrating operation of a preferred embodiment of the invention.
Figure 6:
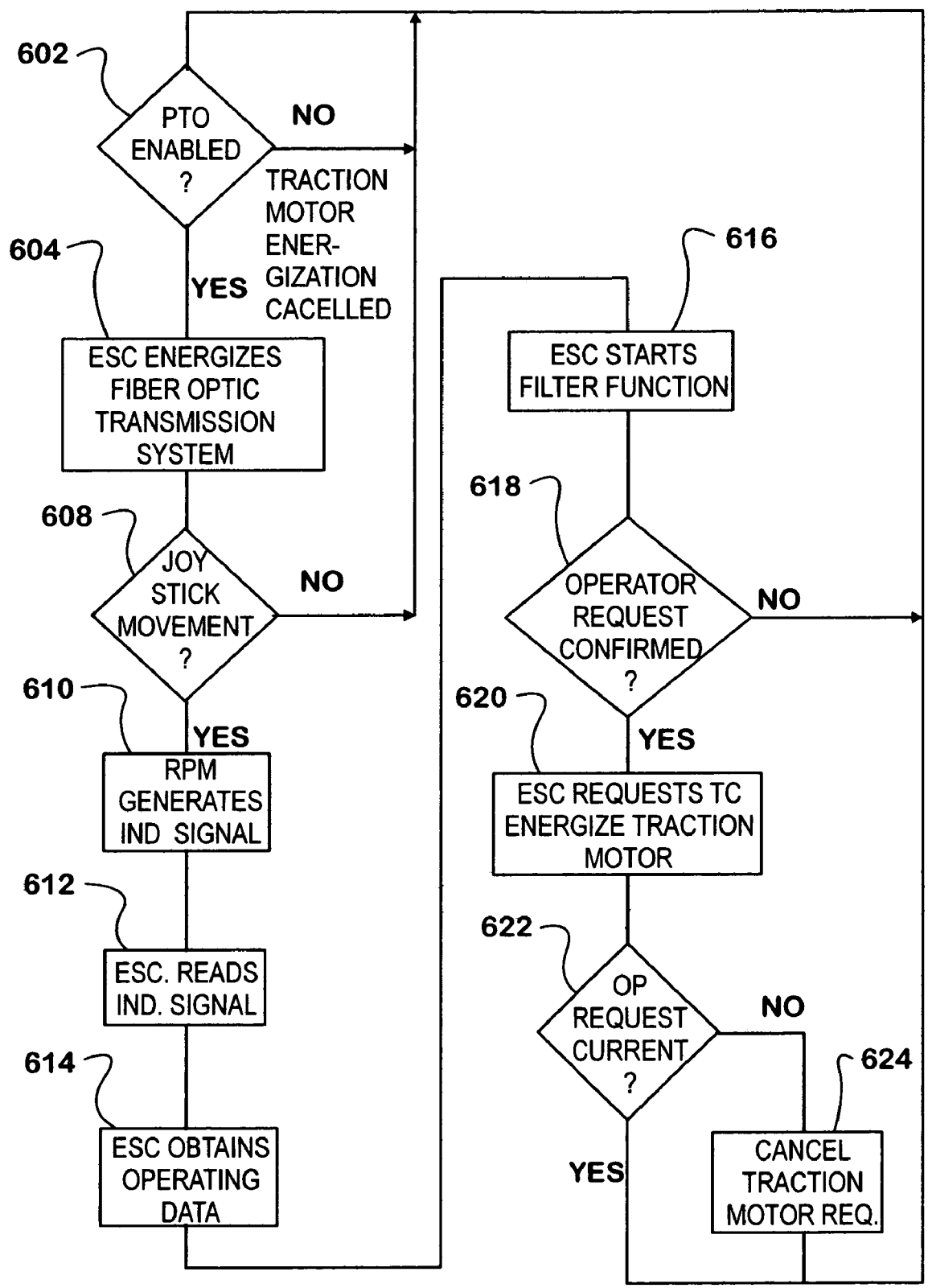
FIG. 6 is a high level flow chart illustrating operation of a preferred embodiment of the invention.

FIGS. 5 and 6 provide a high level overview of operation of control system 20 for aerial tower equipped vehicle 1, provided as an example of application of the invention to a specific environment. Although control is illustrated in flow chart form, those skilled in the art will appreciate that the operational steps are distributed over several controllers and the flow charts do not directly represent a single program executing on a single device, but rather operational steps achieved by cooperation of several logical processors. For aerial tower 2 operation it is preferred that the vehicle 1 be stationary, although for some types of vehicles and PTO applications, this would not be necessary. The first steps thus are directed toward determining if the vehicle 1 is stationary. The ABS controller 50 reports wheel speeds over the public datalink 18, which is read by the transmission controller 42 as indicated at step 500. The transmission controller 42, monitoring transmission push button controller 72 and the drive shaft of transmission 38, determines if neutral has been selected and if the drive shaft has zero output. The transmission controller 42 reports that the transmission 38 is in neutral after vehicle wheel speed is zero, drive shaft output is zero and the selected gear is neutral at step 502. At step 504 the ESC 24 reads that the transmission is in neutral and determines is the park brake has been set. If YES, the ESC 24 reports that the vehicle 1 is in its stationary mode, allowing for request of use of the aerial unit 2. If the result of any of steps 500, 502, or 504 is NO, then the program returns to step 500 for continued monitoring. In other words the ESC 24 is seeing via the public datalink 18 that the Eaton transmission controller 42 is transmitting a "neutral" current gear state, as well as a vehicle speed is "zero" mph. The ESC 24 also sees that the parking brake is set "On" via a hard wire input coming from the chassis' wiring.

It will be understood that other requirements for PTO operation may be added here, for example, it may be required that the ESC 24 report that the hood be closed over the public datalink 18, as determined from a hard wire connection into ESC 24. Given the high voltages at which the hybrid traction system operates this could be required as a safety measure. While PTO operation contemplates operation of traction motor/generator 32, hybrid controller 48 may, on account of battery status, indicate a demand for engine 28 operation, which would be communicated back via transmission controller 42 to ESC 24, which in turn would signal to the engine controller 46 that engine 28 was to be engaged. (It is important that there be a hood closed signal such that the auto clutch and traction motor would not initiate an unexpected engine crank/start with the hood open and someone under the hood and working, should the traction motor/generator batteries state of charge fall below 28% state of charge, initiating a recharge cycle of the 340 volt traction batteries. The ESC does not read or control the traction batteries state of charge. The ESC just tells the Eaton hybrid system not to close the clutch or start the traction motor/generator due to a low state of battery charge.

Once the vehicle 1 is in stationary mode PTO operation for an aerial unit 2 is allowed. As has been stated above, having a stationary vehicle may not be required in other applications. At step 508 an in-cab request for PTO operation (entered typically using switch pack 56 and applied to the ESC 24 over datalink 64) is awaited. As long as the request is not received execution cycles back along the NO branch to step 500. Once a PTO request has been made operational execution advances to step 510. If conditions for PTO operation are not met than indication may be supplied the operator of that fact. At step 510 ESC 24 reports the PTO request on public datalink 18, from which it is read by transmission controller 42. The transmission controller 42 will so advise hybrid controller 48 over datalink 68 (step 512). At step 514 the transmission controller 42 will report power availability for PTO operation over public datalink 18. At step 516 ESC 24 is indicated as energizing the PTO device 22 and RPM 40. In particular, the ESC 24 response to the public datalink indication by commanding one of the RPM's 12 volt outputs, set to a maximum of 20 amps, turn to "On". In this way a "master power" source is provided to PTO device 22 so long as all the conditions described above maintain unchanged.

Referring now to FIG. 6, PTO accessory operation is described. For as long as "Machine Enable" conditions are maintained as determined by the operations described in connection with FIG. 5 and reflected by step 602, and master power is present for the PTO device 22, a fiber optic transceiver system will be energized as indicated by step 604. With the depression (indicated as a decision step 604) of an aerial tower joy stick control lever's trigger (not shown) mounted at the upper controls of the aerial tower 2, a fiber optic signal shall be transmitted down through the aerial tower's upper and lower insulated boom sections 3,4, where upon it will be converted by a hardwire input 66 into a discrete 12 volt signal and sent into one of the RPM 40 inputs. At step 608 receipt by ESC 24 of indication of a 12 volt signal on one of the RPM's 40 inputs via the proprietary datalink 64 is indicated.

Responsive to joy stick movement ESC 24 generates a public datalink 18 signal commanding the hybrid controller 48 (through transmission controller 42) to activate the traction motor/generator 32. The character of that response is subject to some nuances directed to avoiding hydraulic shock and to determining when the operator has ceases requesting movement. Broadly stated, ESC 24 will continue to transmit the public datalink 18 signal for the traction motor/generator's 32 activation so long as it sees the aerial tower joy stick's 12 volt request at the appropriate RPM 40 input. However, once this signal stops coming into the RPM 40 input, the absence of the signal is translated in the ESC's 24 software as the operator's releasing the joy stick's trigger. ESC 24 will continue to send the public datalink 18 signal to the hybrid controller 48 to maintain the traction motor/ generator's 32 operation for an adjustable time interval. The reason why the ESC 24 maintains this signal is to prevent rapid re-activations of the traction motor/generator 32 by the operator creating transient shock/pressure waves within the aerial tower's hydraulic system. Such transients can cause subtle to extreme fluctuations with in the aerial tower's normally smooth operation.

For these reasons, simultaneously as the traction motor/generator 32 drives the PTO/hydraulic pump of the PTO device 22, the ESC 24 monitors a hydraulic pressure transducer (not shown) which is installed in the return side of the aerial tower's 2 hydraulic system. ESC 24 software performs a complex running filter function that will compensate for viscosity variation due to thermal and ambient temperature changes (also monitored by sensors which are not illustrated for the sake of simplicity). It is this complex function that ultimately decides that the operator is no longer requesting, or making any hydraulic system demands. Under these conditions the ESC stops sending the public datalink message to the Eaton hybrid controller requesting the activation of the traction motor/generator's operation. As a result the traction motor/generator stops turning the PTO and awaits the ESC's next command. These steps are reflected in the flow chart where at step 614 the ESC is indicated as obtaining operating data. At step 616 the ESC 24 is indicated as initiating the filter function. At step 618, reflecting both presence of the joy stick movement signal and in consideration of the results of the filtering function, an operator request is confirmed or not (the NO branch). If confirmed (the YES branch) execution of a step 620 is indicated which is a request to the transmission controller 42 (and implicitly the hybrid controller 48) for energization of the traction motor/generator 32. Step 622 reflects continued monitoring of the status of the filtering function and joy stick position signal to determine if aerial tower unit 2 movement is still being requested. If not, step 624 is executed to cancel the request for traction motor 32 operation. Processing is returned to step 602 along the YES branch from step 622 or after step 624 as an indication that PTO enablement must be maintained. It will be understood that if PTO enablement is not maintained that the traction motor energization request is cancelled.

The invention allows the advantageous application of hybrid technology to relatively high mass vehicles, saving fuel, and allowing thermal engines, when in use, to be run at power levels minimizing the production of pollutants or optimizing fuel usage.

While the invention is shown in only one of its forms, it is not thus limited but is susceptible to various changes and modifications without departing from the spirit and scope of the invention.

What is claimed is:

1. A hybrid diesel-electric vehicle comprising:
   a power takeoff system;
   a thermal engine;
   a traction motor/generator;
   a clutch for selectively engaging and disengaging the traction motor/generator and the engine to one another;
   a transmission coupled to the power takeoff system and mechanically coupled to the traction motor/generator for the bidirectional transfer of torque, the transmission having a plurality of operational modes including a neutral state and a torque coupling state;
   a battery for supplying power to the traction motor/generator for operation as a motor and for receiving power from the traction motor/generator when operating as a generator;
   an inverter connected between the battery and the traction motor/generator for regulating power flow between the battery and the traction motor generator;
   a control system for selectively engaging and disengaging the clutch, for selecting an operational mode for the transmission, and for energizing the traction motor/generator from the battery responsive to requests for energization and operation of the power takeoff system;
   the control system including a body computer, a transmission controller, at least a first remote power module, a hybrid controller, a public datalink for communication between the body computer and the transmission controller, a first proprietary datalink for communication between the transmission controller and the hybrid controller and a second proprietary datalink for communication between said at least first remote power module and body computer, where the remote power module is connected to the power takeoff system to supply control signals thereto and to receive control and data inputs therefrom, the body computer and said at least first remote power module generate control signals for the power takeoff system and the body computer generates motive power requests for the power takeoff system and applies these to the public datalink from which they are read by the transmission controller and passed to the hybrid controller over the first proprietary datalink.

2. A hybrid diesel-electric vehicle as claimed in claim 1, further comprising:
   the transmission controller and the body computer being programmed to operate as gateways between datalinks connected to the respective devices for selected signals.

3. A hybrid diesel-electric vehicle as claimed in claim 2, further comprising:
   switching controls for energizing the power takeoff system;
   a third proprietary datalink connecting the switching controls with the body computer for transmission of signals; and
   the body computer being programmed to operate as a gateway between the third proprietary datalink and the second proprietary datalink and the public datalink for selected signals.

4. A hybrid diesel-electric vehicle as claimed in claim 3, further comprising:
   the body computer and the transmission controller being further programmed to respond to signals received on a given bus by generating responsive signals for transmission back on the same bus or to another bus to which the body computer or transmission controller is connected.

5. A hybrid diesel-electric vehicle as claimed in claim 4, further comprising:
   power stored in the battery is the primary source of power for the power takeoff system, operation of the engine during power takeoff operation being restricted to periods when battery state of charge indicates a need for charging and operation of the engine being done at a thermally efficient output level.

6. A hybrid diesel-electric vehicle as claimed in claim 5, further comprising:
   the power takeoff system is an aerial tower unit.

7. A vehicle drive train comprising:
   a power takeoff accessory including control outputs and inputs;

a remote power module connected to the power takeoff system for supplying signals to the control inputs of the power takeoff accessory and receiving control outputs therefrom;

a thermal engine;

a traction motor/generator;

a clutch for selectively engaging and disengaging the traction motor/generator and the engine to one another;

a traction battery;

an inverter connected between the traction battery and the traction motor/generator for controlling flow of power between the traction battery and the traction motor/generator;

a transmission coupled to the power takeoff system and mechanically coupled to the traction motor/generator for the bidirectional transfer of torque, the transmission having a plurality of operational modes including a neutral state and a torque coupling state;

a transmission controller connected to the transmission for selecting its operational mode and to the clutch for controlling engagement thereof;

a hybrid controller connected for communication over a first proprietary bus to the transmission controller for control of the inverter for energization of the traction motor/generator responsive to a request from the transmission controller;

a body computer connected to the transmission controller for communication by a public datalink, the body computer being electrically connected send and receive signals from the power takeoff system and being responsive thereto to generate signals for transmission over the public datalink for receipt by the transmission controller for requesting traction motor/generator energization for operation of the power takeoff system.

8. A vehicle drive train as claimed in claim 7, further comprising:

electrical connection of the body computer to the power takeoff system being through a second proprietary datalink and a remote power module.

9. A vehicle drive train as claimed in claim 8, further comprising:

a switch pack for activation of the power takeoff system; and a third proprietary datalink connecting the switch pack with the body computer for communication of data including switch states.

10. A vehicle drive train as claimed in claim 9, further comprising:

the body computer and the transmission controller being programmed to operate as gateways between datalinks for selected signals.

11. Apparatus comprising:

a traction motor/generator;

a source of regenerative torque connected to the traction motor/generator;

a traction battery;

an inverter connected between the traction battery and the traction motor/generator for supplying power in either direction between the traction battery and the traction motor/generator;

a power takeoff system for energization from the traction motor/generator;

a distributed control system including at least three data busses, a body computer, a transmission controller and a hybrid controller, the body computer providing control of the power takeoff system, the transmission controller providing control of the source of regenerative torque and the hybrid controller controlling the inverter and energization of the traction motor/generator with the body computer and transmission controller communicating over a first data bus, the hybrid controller and the transmission controller communicating over a second data bus and the body computer supplying control signals and receiving data relating to the power takeoff system over a third data bus.

12. Apparatus as set forth in claim 11, further comprising:

the third data bus terminating in a remote power unit, which is coupled to the power takeoff system.

13. Apparatus as set forth in claim 12, further comprising:

a switch pack for operator inputs relating to the power takeoff system; and a fourth data bus connected between the switch pack and the body computer.

14. Apparatus as set forth in claim 13, further comprising:

the body computer operating as a gateway between data busses for selected signals and being programmed to generate responsive signals to still other selected signals for application to the data busses.

* * * * *